United States Patent
Fahn et al.

(10) Patent No.: US 8,358,845 B2
(45) Date of Patent: Jan. 22, 2013

(54) METHOD FOR LABELING CONNECTED COMPONENTS AND COMPUTER SYSTEM USING THE METHOD

(75) Inventors: Chin-Shyurng Fahn, Taipei (TW); Keng-Li Lin, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 294 days.

(21) Appl. No.: 12/837,515

(22) Filed: Jul. 16, 2010

(65) Prior Publication Data

US 2011/0158534 A1 Jun. 30, 2011

(30) Foreign Application Priority Data

Dec. 24, 2009 (TW) .............................. 98144808 A (51) Int. Cl.
G06K 9/34 (2006.01)
G06K 9/00 (2006.01)
(52) U.S. Cl. ...................................................... 382/180
(58) Field of Classification Search .................. 382/133, 382/154, 164, 176, 177, 180, 190, 191, 203, 382/204, 224; 348/169, 586, 587; 707/101, 707/517–521, 531; 345/600, 604
See application file for complete search history.

(56) References Cited

U.S. PATENT DOCUMENTS

| 4,991,224 | A * | 2/1991 | Takahashi et al. | 382/180 |
| 5,054,091 | A * | 10/1991 | Tanaka et al. | 382/177 |
| 6,327,387 | B1 * | 12/2001 | Naoi et al. | 382/190 |
| 6,993,185 | B2 * | 1/2006 | Guo et al. | 382/176 |
| 7,136,518 | B2 * | 11/2006 | Griffin et al. | 382/133 |
| 7,142,693 | B2 * | 11/2006 | Zhang et al. | 382/100 |
| 7,254,268 | B2 * | 8/2007 | Zhao et al. | 382/190 |
| 7,570,816 | B2 * | 8/2009 | Bargeron et al. | 382/224 |
| 2011/0158534 | A1 * | 6/2011 | Fahn et al. | 382/180 |

OTHER PUBLICATIONS

Lin et al. "An Efficient Two-Phase Algorithm for Labeling Connected Components Based on a Two-Scan Structure", Thesis of Master Degree, National Taiwan University of Science and Technology, Jul. 20, 2009.

* cited by examiner

*Primary Examiner* — Amir Alavi
(74) *Attorney, Agent, or Firm* — Jianq Chyun IP Office (57) ABSTRACT

A method for labeling connected components and a computer system using the method are provided. With the method, during a process of scanning an image for the first time, each object pixel in the image is assigned a temporary label, and a relationship between each temporary label and a representative label is established after the completion of the process of scanning the image for the first time. Thereafter, the temporary label of each object pixel is replaced by the corresponding representative label during a process of scanning the image for the second time. As a result, the labeling of the connected components can be accomplished by only scanning the image twice such that the efficiency of labeling the connected components can be significantly improved.

27 Claims, 9 Drawing Sheets

METHOD FOR LABELING CONNECTED COMPONENTS AND COMPUTER SYSTEM USING THE METHOD

CROSS-REFERENCE TO RELATED APPLICATION

This application claims the priority benefit of Taiwan application serial no. 98144808, filed on Dec. 24, 2009. The entirety of the above-mentioned patent application is hereby incorporated by reference herein and made a part of this specification.

BACKGROUND OF THE INVENTION

1. Field of the Invention

The invention relates to a method of processing an image. More particularly, the invention relates to a method of labeling connected components in an image and a computer system using the method.

2. Description of Related Art

In the field of image processing, the algorithm of labeling connected components is a technique capable of identifying data of the same block among scattered data by utilizing the computer system. In other words, an image may include a plurality of object blocks and the algorithm of labeling connected components identifies connected pixels in the image after scanning so as to distinguish each object block. The identification result generated therefrom can then be provided to other systems. For instance, before processing other operations, a visual tracking system and a visual identifying system both require the algorithm of labeling connected components to pre-process the image.

In the conventional algorithm of labeling connected components, pixels of the same object block in the image may be temporarily labeled with different labels during the labeling process. Consequently, the image has to be scanned repetitively and an equivalent process has to be performed on the labels in order to reflect the actual state of the image patterns. That is, the algorithm of labeling connected components must scan the image repetitively until the label value does not change anymore.

Accordingly, whether adopting methods such as the recursive method or the pixel searching method, the conventional algorithm of labeling connected components still requires high time complexity to complete the processing. Thus, in practice, the conventional algorithm of labeling connected components is mostly adopted in back-end processes or non-real time systems because its performance is not satisfied with the demands of most real-time systems.

SUMMARY OF THE INVENTION

The invention relates to a method of labeling connected components for avoiding mass amount of repetitive operations so as to increase the speed for labeling the connected components in the image.

The invention is directed to a computer system capable of completing the labeling of connected components in the image by scanning the image twice.

The invention is directed to a method of labeling connected components for an image having a plurality of pixels, and each pixel is either an object pixel or a background pixel. With this method, the image is scanned in row-major order to acquire an object block located on the same row of the image. The object block includes i object pixels that are connected to one another, where i is a positive integer. A first phase labeling process is executed according to an upper left pixel, an upper pixel, and an upper right pixel of a first object pixel in the object block to set a temporary label of the first object pixel and determine a representative label corresponding to the temporary label. When i is larger than 1, a second phase labeling process is performed sequentially for i−1 times according to the upper right pixel of each of a second object pixel to an $i^{th}$ object pixel in the object block to set the temporary label of each of the second object pixel to the $i^{th}$ object pixel and determine the representative label corresponding to the temporary label. The above steps are repeatedly executed until the image has been scanned completely. The temporary label of each object pixel in the image is replaced with the corresponding representative label according to a relationship between each temporary label and each representative label.

According to an embodiment of the invention, the step of executing the first phase labeling process includes determining whether the upper left pixel, the upper pixel, and the upper right pixel are all background pixels. When the upper left pixel, the upper pixel, and the upper right pixel are all determined to be background pixels, a new label value is acquired as the temporary label of the first object pixel and the representative label corresponding to the temporary label. When the upper left pixel, the upper pixel, and the upper right pixel are not all determined to be background pixels, the temporary label of the upper right pixel is adopted as the temporary label of the first object pixel, and whether the representative labels respectively corresponding to the temporary labels of the upper left pixel, the upper pixel, and the upper right pixel are the same is determined. When the representative labels respectively corresponding to the temporary labels of the upper left pixel, the upper pixel, and the upper right pixel are not the same, a first label equivalence operation is performed according to the temporary label of each of the upper left pixel and the upper right pixel.

According to an embodiment of the invention, the step of executing the first label equivalence operation includes designating the representative label corresponding to the temporary label of the upper left pixel as a first value and designating the representative label corresponding to the temporary label of the upper right pixel as a second value. When the first value is smaller than the second value, at least one to-be-updated temporary label is acquired from all of the temporary labels in which the representative label of each of the at least one to-be-updated temporary label is equal to the second value, and the first value is adopted as the representative label corresponding to the at least one to-be-updated temporary label. When the second value is smaller than the first value, at least one to-be-updated temporary label is acquired from all of the temporary labels in which the representative label of each of the at least one to-be-updated temporary label is equal to the first value, and the second value is adopted as the representative label corresponding to the at least one to-be-updated temporary label.

According to an embodiment of the invention, the step of executing the second phase labeling process sequentially for i−1 times includes acquiring one of the second object pixel to the $i^{th}$ object pixel as a currently-processed pixel according to a sequence order of the second object pixel to the $i^{th}$ object pixel in the object block, and adopting the temporary label of a left pixel of the currently-processed pixel as the temporary label of the currently-processed pixel. When the upper right pixel of the currently-processed pixel is not the background pixel, whether the representative labels respectively corresponding to the temporary labels of the upper right pixel and the left pixel are the same is determined. When the representative labels respectively corresponding to the temporary labels of the upper right pixel and the left pixel are not the same, a second label equivalence operation is performed according to the temporary label of each of the upper right pixel and the left pixel. The above steps are repeatedly executed until the second object pixels to the $i^{th}$ object pixel have all been processed. According to an embodiment of the invention, the step of executing the second label equivalence operation includes designating the representative label corresponding to the temporary label of the left pixel as a first value and designating the representative label corresponding to the temporary label of the upper right pixel as a second value. When the first value is smaller than the second value, at least one to-be-updated temporary label is acquired from all of the temporary labels in which the representative label of each of the at least one to-be-updated temporary label is equal to the second value, and the first value is adopted as the representative label corresponding to the at least one to-be-updated temporary label. When the second value is smaller than the first value, at least one to-be-updated temporary label is acquired from all of the temporary labels in which the representative label of each of the at least one to-be-updated temporary label is equal to the first value, and the second value is adopted as the representative label corresponding to the at least one to-be-updated temporary label.

According to an embodiment of the invention, the step of replacing the temporary label of each object pixel in the image with the corresponding representative label according to the relationship between each temporary label and each representative label includes re-scanning the image, and when a pixel being currently scanned is the object pixel, replacing the temporary label of the currently scanned pixel with the corresponding representative label according to the relationship between each temporary label and each representative label.

According to an embodiment of the invention, before the step of scanning the image in row-major order, the method further includes performing a pixel classification process on the image for distinguishing each pixel to be the object pixel or the background pixel.

According to an embodiment of the invention, the row-major order is to process an image from the upper leftmost corner to the bottom rightmost corner, and the first object pixel is an upper leftmost pixel in the object block.

According to another aspect of the invention, a computer system including an image acquiring module, a first scanning module, and a second scanning module is provided. Herein, the image acquiring module is configured for capturing an image having a plurality of pixels, where each pixel is an object pixel or a background pixel. The first scanning module is coupled to the image acquiring module and scans the image in row-major order to acquire an object block on the same row of the image. Here, the object block includes i object pixels that are connected to one another (i is a positive integer). The first scanning module performs a first phase labeling process according to an upper left pixel, an upper pixel, and an upper right pixel of a first object pixel in the object block to set a temporary label of the first object pixel, and determine a representative label corresponding to the temporary label. When i is larger than 1, the first scanning module performs a second phase labeling process sequentially for i−1 times according to the upper right pixel of each of a second object pixel to an $i^{th}$ object pixel in the object block to set the temporary label of each of the second object pixel to the $i^{th}$ object pixel and determine the representative label corresponding to the temporary label. The first scanning module repeats above operations until the image has been scanned completely. The second scanning module is coupled to the first scanning module for replacing the temporary label of each object pixel in the image with the corresponding representative label according to a relationship between each temporary label and each representative label.

According to an embodiment of the invention, when performing the first phase labeling process, the first scanning module starts to determine whether the upper left pixel, the upper pixel, and the upper right pixel are all background pixels. When the upper left pixel, the upper pixel, and the upper right pixel are all determined to be background pixels, the first scanning module acquires a new label value as the temporary label of the first object pixel and the representative label corresponding to the temporary label. When the upper left pixel, the upper pixel, and the upper right pixel are not all determined to be background pixels, the first scanning module adopts the temporary label of the upper right pixel as the temporary label of the first object pixel, and determines whether the representative labels respectively corresponding to the temporary labels of the upper left pixel, the upper pixel, and the upper right pixel are the same. When the representative labels respectively corresponding to the temporary labels of the upper left pixel, the upper pixel, and the upper right pixel are not the same, the first scanning module performs a first label equivalence operation according to the temporary label of each of the upper left pixel and the upper right pixel.

According to an embodiment of the invention, when performing the first label equivalence operation, the first scanning module first designates the representative label corresponding to the temporary label of the upper left pixel as a first value and designates the representative label corresponding to the temporary label of the upper right pixel as a second value. When the first value is smaller than the second value, the first scanning module acquires at least one to-be-updated temporary label from all of the temporary labels in which the representative label of each of the at least one to-be-updated temporary label is equal to the second value, and adopts the first value as the representative label corresponding to the at least one to-be-updated temporary label. When the second value is smaller than the first value, the first scanning module acquires at least one to-be-updated temporary label from all of the temporary labels in which the representative label of each of the at least one to-be-updated temporary label is equal to the first value, and adopts the second value as the representative label corresponding to the at least one to-be-updated temporary label.

According to an embodiment of the invention, when performing the second phase labeling process sequentially for i−1 times, the first scanning module first acquires one of the second object pixel to the $i^{th}$ object pixel as a currently-processed pixel according to a sequence order of the second object pixel to the $i^{th}$ object pixel in the object block, and adopts the temporary label of a left pixel of the currently-processed pixel as the temporary label of the currently-processed pixel. When the upper right pixel of the currently-processed pixel is not the background pixel, the first scanning module determines whether the representative labels respectively corresponding to the temporary labels of the upper right pixel and the left pixel are the same. When the representative labels respectively corresponding to the temporary labels of the upper right pixel and the left pixel are not the same, the first scanning module performs a second label equivalence operation according to the temporary label of each of the upper right pixel and the left pixel. The first scanning module repeats above operations until the second object pixel to the $i^{th}$ object pixel have all been processed.

According to an embodiment of the invention, when performing the second label equivalence operation, the first scanning module designates the representative label corresponding to the temporary label of the left pixel as a first value and designates the representative label corresponding to the temporary label of the upper right pixel as a second value. When the first value is smaller than the second value, the first scanning module acquires at least one to-be-updated temporary label from all of the temporary labels in which the representative label of each of the at least one to-be-updated temporary label is equal to the second value, and adopts the first value as the representative label corresponding to the at least one to-be-updated temporary label. When the second value is smaller than the first value, the first scanning module acquires at least one to-be-updated temporary label from all of the temporary labels in which the representative label of each of the at least one to-be-updated temporary label is equal to the first value, and adopts the second value as the representative label corresponding to the at least one to-be-updated temporary label.

According to an embodiment of the invention, the second scanning module re-scans the image, and when a pixel being currently scanned is the object pixel, the second scanning module replaces the temporary label of the currently scanned pixel with the corresponding representative label according to the relationship between each temporary label and each representative label.

According to an embodiment of the invention, the image acquiring module performs a pixel classification process on the image for distinguishing each pixel to be the object pixel or the background pixel.

According to an embodiment of the invention, the row-major order is to process an image from the upper leftmost corner to the bottom rightmost corner, and the first object pixel is an upper leftmost pixel in the object block.

In light of the foregoing, in the invention, when the connected components in the image are being labeled, the image is first scanned in units of row such that the object pixels connected in the same row are acquired. The connected object pixels are then labeled in two phases. After the image has been scanned for the first time, each object pixel is set with a temporary label, and each temporary label is set with a corresponding representative label. The image is then scanned again, and when each object pixel is scanned, the temporary label thereof is replaced with a corresponding representative label so as to complete the labeling of the connected object pixels in the entire image. The invention only needs to scan the image twice to complete the labeling of the connected components such that the time complexity required by the labeling is greatly reduced, thereby enhancing the processing efficiency.

DESCRIPTION OF EMBODIMENTS

Figure 1:
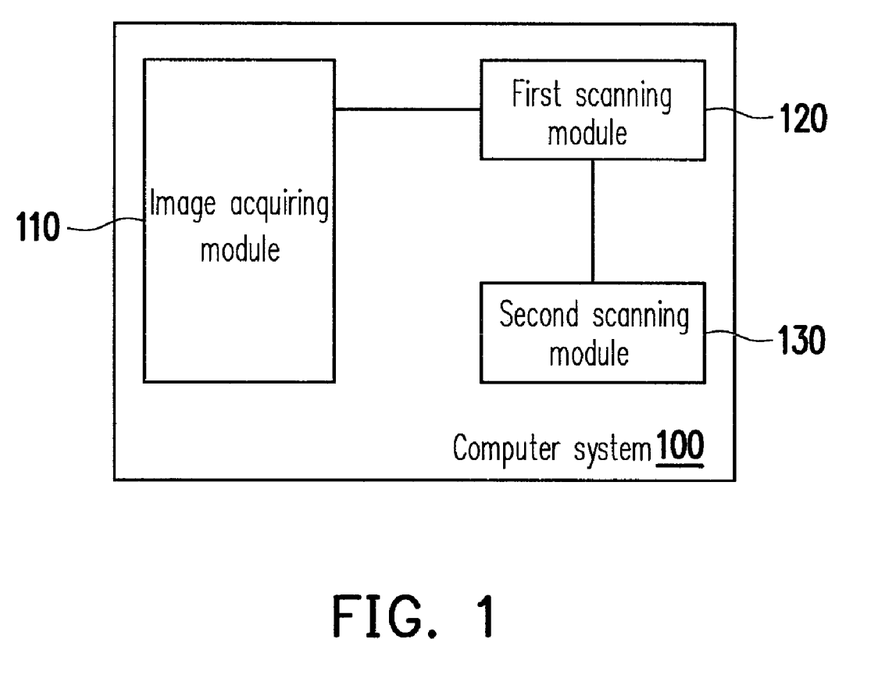
FIG. 1 is a schematic block diagram of a computer system according to an embodiment of the invention.

Referring to FIG. 1, a computer system 100 includes an image acquiring module 110, a first scanning module 120, and a second scanning module 130. In the present embodiment, the computer system 100 is a desktop computer system, a notebook computer system, a server, or other electronic devices having processing capacity.

The image acquiring module 110 is configured to perform a pixel classification process on an acquired image, so as to distinguish each of the pixels in the image to be an object pixel or a background pixel. Here, the object pixel is a portion that has to be labeled in the process of labeling connected components. For instance, the image acquiring module 110 converts a color image into a grayscale image and performs a binarization process on the image for further distinguishing each pixel to be an object pixel or a background pixel. In one embodiment, the pixels at the outer periphery of the image are predetermined to be background pixels. In another embodiment, the size of the image is expanded outwardly to prevent the object pixels from locating at the periphery of the original image, which increases the processing complexity.

As shown in FIG. 1, the first scanning module 120 is coupled to the image acquiring module 110, and the second scanning module 130 is coupled to the first scanning module 120. The first scanning module 120 and the second scanning module 130 are, for example, hardware or software components having computing capacity, or a combination thereof. At the beginning of a labeling process performed on the image, the first scanning module 120 labels each object pixel with a temporary label and establishes a relationship between the temporary label used and a representative label thereof in the meantime. After the operation of the first scanning module 120, the second scanning module 130 then scans the image again and replaces the temporary label of each object pixel with the corresponding representative label according to the relationship between each temporary label and each representative label, thereby completing the entire labeling process.

In other words, when the computer system 100 is used for labeling the connected components in the image, the first scanning module 120 and the second scanning module 130 are only required to scan the image each once for providing each object pixel a suitable label. In order to further describe the operating process of the computer system 100, another embodiment is provided below to illustrate the invention in detail.

Figure 2:
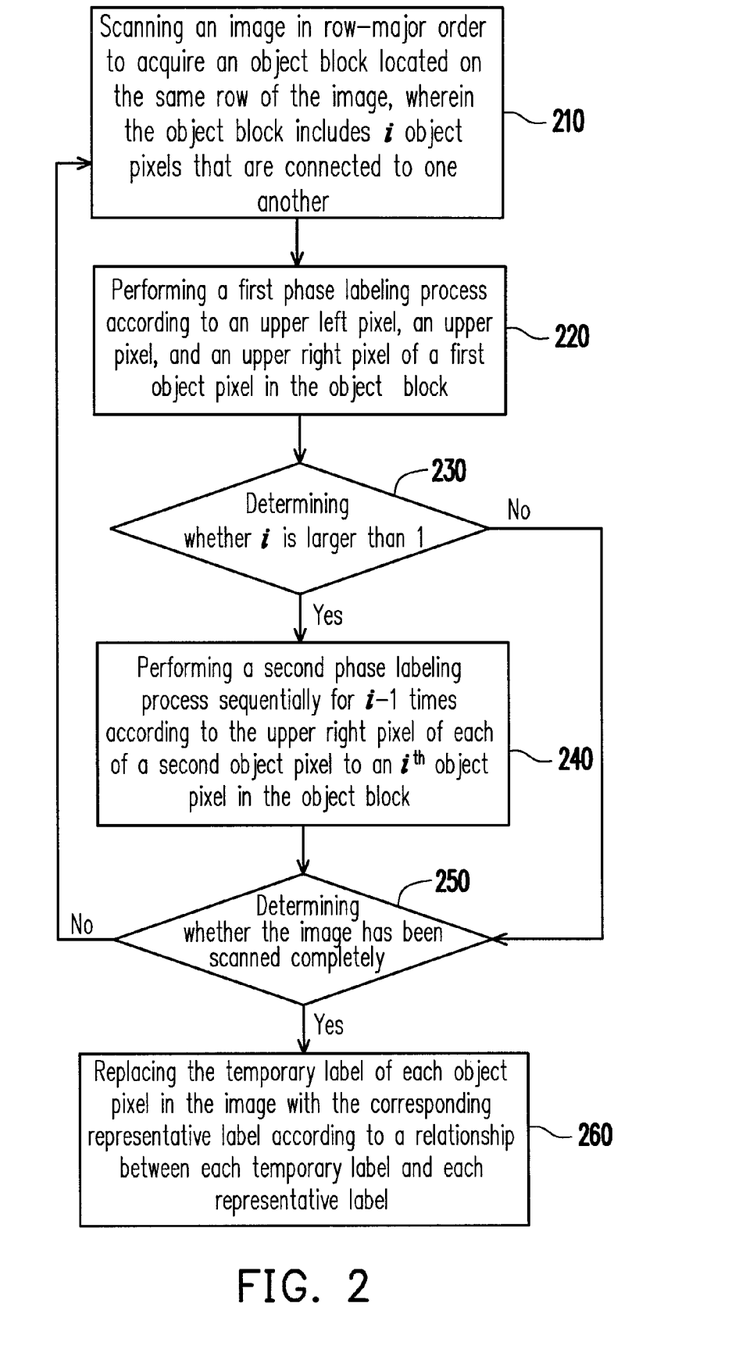
FIG. 2 is a flowchart illustrating a method of labeling connected components according to an embodiment of the invention.

After the image acquiring module 110 has captured the image to be processed and distinguished each pixel to be an object pixel or a background pixel, the first scanning module 120 starts to scan the image in row-major order to acquire an object block located on the same row of the image, as depicted in Step 210. Herein, the object block includes i object pixels that are connected to one another (i is a positive integer).

In Step 220, the first scanning module 120 performs a first phase labeling process according to an upper left pixel, an upper pixel, and an upper right pixel of a first object pixel in the object block, so as to set a temporary label of the first object pixel and determine a representative label corresponding to the temporary label. In the present embodiment, the row-major order is to process the image from the upper leftmost corner to the bottom rightmost corner, and the first object pixel is an upper leftmost pixel in the object block.

Figure 3A:
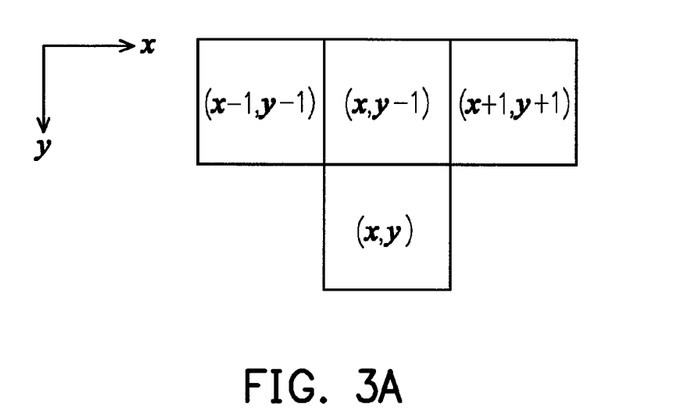
FIG. 3A is a schematic diagram illustrating pixels to be referred to when a first phase labeling process is performed according to an embodiment of the invention.

As shown in FIG. 3A, assuming coordinates of the first object pixel in the object block to be (x, y), the first scanning module 120 then performs the first phase labeling process by referring to the upper left pixel with coordinates of (x−1, y−1), the upper pixel with coordinates of (x, y−1), and the upper right pixel with coordinates of (x+1, y−1). In the following, the steps of the first scanning module 120 performing the first phase labeling process are described in detail.

At the beginning, the first scanning module 120 determines whether the upper left pixel, the upper pixel, and the upper right pixel of the first object pixel are all background pixels. When the upper left pixel, the upper pixel, and the upper right pixel of the first object pixel are all background pixels, the object block currently acquired is then a new object in the image. Thus, the first scanning module 120 acquires a new label value as the temporary label of the first object pixel and the representative label corresponding to the temporary label. Here, the new label value must be a label value which has not been used in the labeling process of the image. Nevertheless, when the upper left pixel, the upper pixel, and the upper right pixel are not all determined to be background pixels, the first scanning module 120 then adopts the temporary label of the upper right pixel as the temporary label of the first object pixel, and determines whether the representative labels respectively corresponding to the temporary labels of the upper left pixel, the upper pixel, and the upper right pixel are the same.

When the representative labels respectively corresponding to the temporary labels of the upper left pixel, the upper pixel, and the upper right pixel are the same, this means that the above temporary labels have been merged into the same set, and thus no other label equivalence operation has to be performed. However, when the representative labels respectively corresponding to the above temporary labels are not the same, the first scanning module 120 performs a first label equivalence operation according to the temporary label of each of the upper left pixel and the upper right pixel.

In details, when the first scanning module 120 performs the first label equivalence operation, the representative label corresponding to the temporary label of the upper left pixel is first designated as a first value, and the representative label corresponding to the temporary label of the upper right pixel is designated as a second value.

When the first value is smaller than the second value, the first scanning module 120 acquires at least one to-be-updated temporary label from all of the temporary labels in which the representative label corresponding to each of the at least one to-be-updated temporary label is equal to the second value, and adopts the first value as the representative label corresponding to the at least one to-be-updated temporary label. When the second value is smaller than the first value, the first scanning module 120 acquires at least one to-be-updated temporary label from all of the temporary labels in which the representative label corresponding to each of the at least one to-be-updated temporary label is equal to the first value, and adopts the second value as the representative label corresponding to the at least one to-be-updated temporary label. Up to this point, the steps of the first phase labeling process are completed.

Next, in Step 230, whether i is larger than 1 is determined. When i is larger than 1, this represents that the object block currently acquired includes more than one object pixels. Consequently, as shown in Step 240, the first scanning module 120 performs a second phase labeling process sequentially for i−1 times according to the upper right pixel of each of a second object pixel to an $i^{th}$ object pixel in the object block to set the temporary label of each of the second object pixel to the $i^{th}$ object pixel and determine the representative label corresponding to the temporary label. When performing the second phase labeling process, the first scanning module 120 refers to the pixels illustrated in FIG. 3B. Assuming the coordinates of a $j^{th}$ object pixel in the object block to be (x, y) and $2 \leq j \leq i$, the first scanning module 120 then refers to the upper right pixel with the coordinates (x+1, y−1) when performing the second phase labeling process according to the $j^{th}$ object pixel. The steps of the first scanning module 120 performing the second phase labeling process are depicted in detail in the following.

Figure 3B:
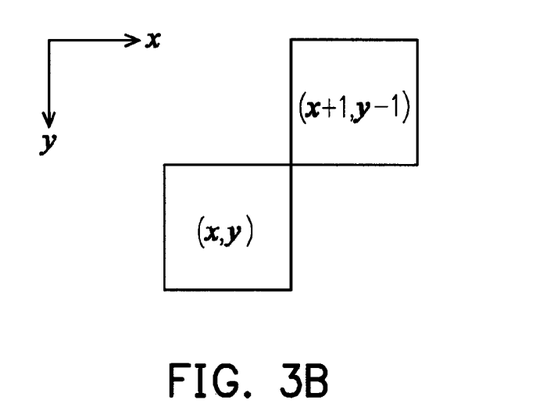
FIG. 3B is a schematic diagram illustrating pixels to be referred to when a second phase labeling process is performed according to an embodiment of the invention.

Firstly, the first scanning module 120 acquires one of the second object pixel to the $i^{th}$ object pixel as a pixel to be processed (referred as the currently-processed pixel hereinafter) according to a sequence order of the second object pixel to the $i^{th}$ object pixel in the object block. Thereafter, the first scanning module 120 acquires the temporary label of a left pixel of the currently-processed pixel as the temporary label of the currently-processed pixel. The first scanning module 120 next determines whether the upper right pixel of the currently-processed pixel is a background pixel. When the upper right pixel of the currently-processed pixel is a background pixel, then no label equivalence operation has to be performed. When the upper right pixel of the currently-processed pixel is not a background pixel, the first scanning module 120 determines whether the representative labels respectively corresponding to the temporary labels of the upper right pixel and the left pixel are the same. When the representative labels respectively corresponding to the temporary labels of the upper right pixel and the left pixel are the same, this means that the above temporary labels are in the same set; thus, no label equivalence operation has to be carried out. When the representative labels respectively corresponding to the temporary labels of the upper right pixel and the left pixel are not the same, the first scanning module 120 performs a second label equivalence operation according to the temporary label of each of the upper right pixel and the left pixel. The first scanning module 120 repeats the above operations to the second object pixel to the $i^{th}$ object pixel in the object block until each object pixel in the object block has been processed.

When performing the second label equivalence operation, the first scanning module 120 first acquires the temporary label of the left pixel of the currently-processed pixel, and designates the representative label corresponding to the temporary label as a first value. Moreover, the first scanning module 120 acquires the temporary label of the upper right pixel of the currently-processed pixel and designates the representative label corresponding to the temporary label as a second value. When the first value is smaller than the second value, the first scanning module 120 acquires at least one to-be-updated temporary label from all of the temporary labels in which the representative label of each of the at least one to-be-updated temporary label is equal to the second value, and adopts the first value as the representative label corresponding to the one or more to-be-updated temporary labels. When the second value is smaller than the first value, the first scanning module 120 acquires at least one to-be-updated temporary label from all of the temporary labels in which the representative label of each of the at least one to-be-updated temporary label is equal to the first value, and adopts the second value as the representative label corresponding to the one or more to-be-updated temporary labels. In other words, in the present embodiment, the first scanning module 120 performs the second label equivalence operation by replacing the representative label of a larger value with the representative label of a smaller value.

Figure 3C:
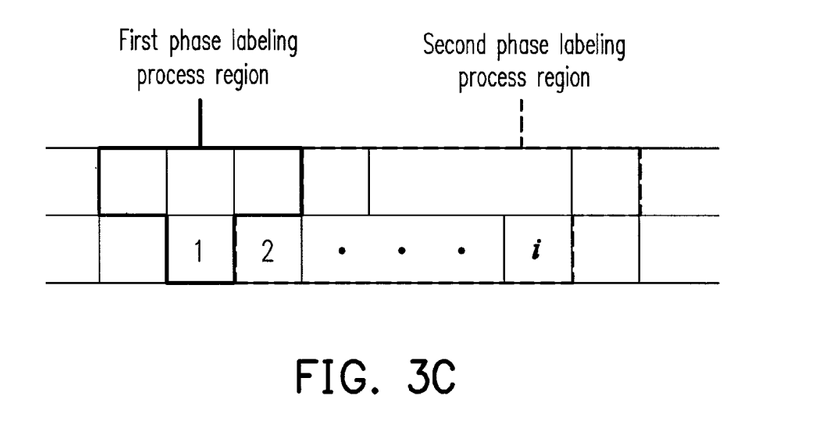
FIG. 3C is a schematic diagram illustrating an object block and labeling processing regions according to an embodiment of the invention.

As depicted above, when the object block currently acquired includes 1 to i object pixels (where i is larger than 1), the first scanning module 120 then executes the first phase labeling process according to the first object pixel and executes the second phase labeling process to the remaining second object pixel to the $i^{th}$ object pixel. The first scanning module 120 performs the two-phase labeling process to this object block by referring to the pixel regions as shown in FIG. 3C respectively. Nevertheless, when is not determined to be larger than 1 in Step 230, this means that the object block currently acquired only includes a single object pixel, thus the first scanning module 120 does not need to carry out the second phase labeling process.

Next, as shown in Step 250, the first scanning module 120 determines whether the image has been scanned completely. If the image has not been scanned completely, this shows that there is another object block that is located on the same row of the image, but has not yet been processed. As a consequence, in the method of labeling connected components, the first scanning module 120 then returns to Step 210 and scans the images in row-major order to acquire the next object block and repeats Steps 210 through 250, thereby labeling each object pixel in the image with a temporary label and setting a representative label corresponding to each temporary label.

Upon completion of the first scanning, each object pixel is labeled with a temporary label. In addition, through the above steps, the temporary labels of the same component in the image also correspond to the same representative label. Thus, as shown in Step 260, the second scanning module 130 replaces the temporary label of each object pixel in the image with the corresponding representative label according to the relationship between each temporary label and each representative label. Specifically, the second scanning module 130 re-scans the image, and when a processing pixel being scanned is an object pixel, the second scanning module 130 replaces the temporary label of the processing pixel with the corresponding representative label according to the relationship between each temporary label and each representative label. Through the aforementioned replacement, the object pixels of the same component are then labeled with the same representative label.

Generally, the object pixels usually present in the image in a continuous manner. When executing the method of labeling connected components as depicted in FIG. 2, the computer system 100 is capable of completing the labeling process of the object pixels more rapidly if the object pixels are shown in rows in the image, thereby reducing the time wasted from a mass amount of repetitive operations so as to enhance the efficiency of labeling connected components.

Figure 4A:
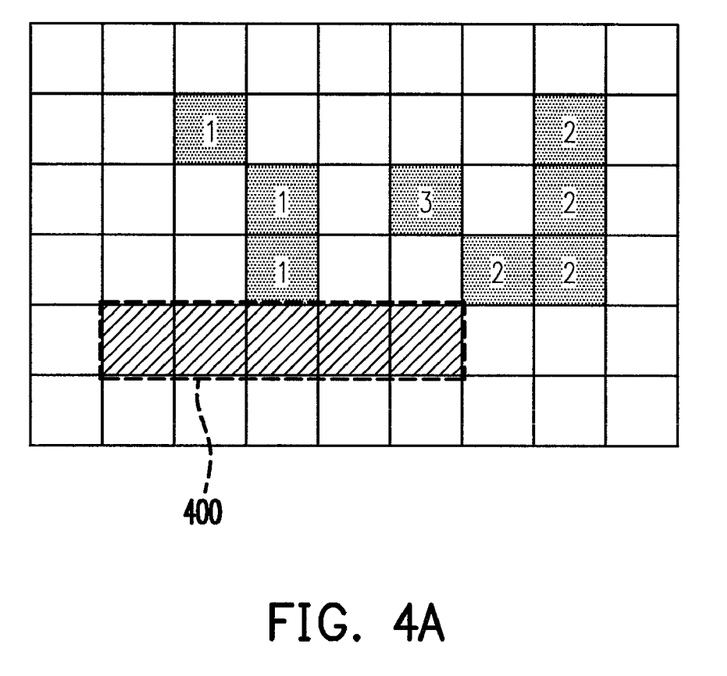
FIGS. 4A through 4F are schematic diagrams illustrating a labeling process according to an embodiment of the invention.

In the image shown in FIG. 4A, a blank block represents a background pixel and a dotted block represents an object pixel labeled with a temporary label. In addition, the number in the block is the value of the corresponding temporary label of each object pixel. Here, three object pixels are each labeled with a temporary label "1," four object pixels are each labeled with a temporary label "2," and one object pixel is labeled with a temporary label "3." Table 1 illustrates a relationship between a current temporary label and a representative label corresponding thereto:

TABLE 1

| Temporary label | 1 | 2 | 3 |
|---|---|---|---|
| Representative label | 1 | 2 | 2 |

Figure 4B:
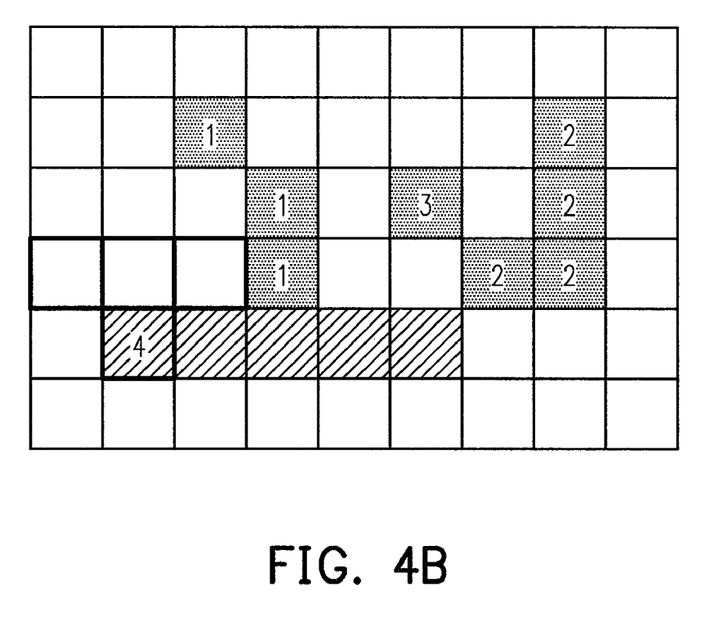

Assuming an object block 400 including 5 object pixels is acquired by scanning an image in row-major order, then when the object block 400 is to be labeled, a first phase labeling process is performed according to a first object pixel in the object block 400 and an upper left pixel, an upper pixel, and an upper right pixel thereof. As depicted in FIG. 4B, the first object pixel is a leftmost pixel in the object block 400. Since the upper left pixel, the upper pixel, and the upper right pixel of the first object pixel are all background pixels, a new label value (i.e., "4") is adopted as a temporary label of the first object pixel. Furthermore, "4" is also adopted as a representative label corresponding to the temporary label. Upon completion of the above steps, Table 2 indicates a relationship between the temporary label and the representative label corresponding thereto:

TABLE 2

| Temporary label | 1 | 2 | 3 | 4 |
|---|---|---|---|---|
| Representative label | 1 | 2 | 2 | 4 |

Figure 4C:
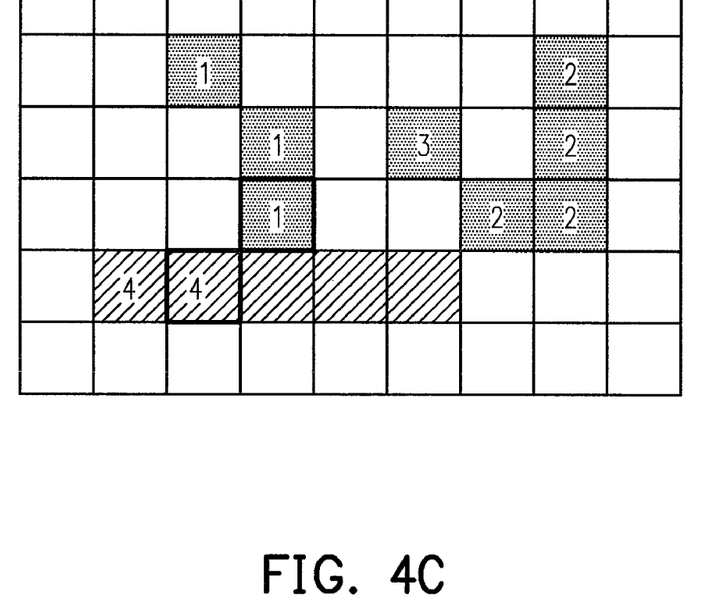

Next, a second phase labeling process is performed to other object components in the object block 400. As shown in FIG. 4C, firstly, a temporary label which is equivalent to a left pixel of a second object pixel is provided to the second object pixel. Since an upper right pixel of the second object pixel in the object block 400 is not a background pixel, a second label equivalence operation has to be performed. As shown in Table 2, since a representative label "1" corresponding to a temporary label "1" of the upper right pixel is smaller than a representative label "4" corresponding to a temporary label "4" of the left pixel in the second object pixel, the representative label "4" is replaced by the representative label "1" according to a relationship between the temporary label and the representative label. That is, the temporary label "4" originally corresponded to the representative label "4" is now corresponding to the representative label "1." At this time, a relationship between the temporary label and the representative label corresponding thereto is recorded in Table 3:

TABLE 3

| Temporary label | 1 | 2 | 3 | 4 |
|---|---|---|---|---|
| Representative label | 1 | 2 | 2 | 1 |

Figure 4D:
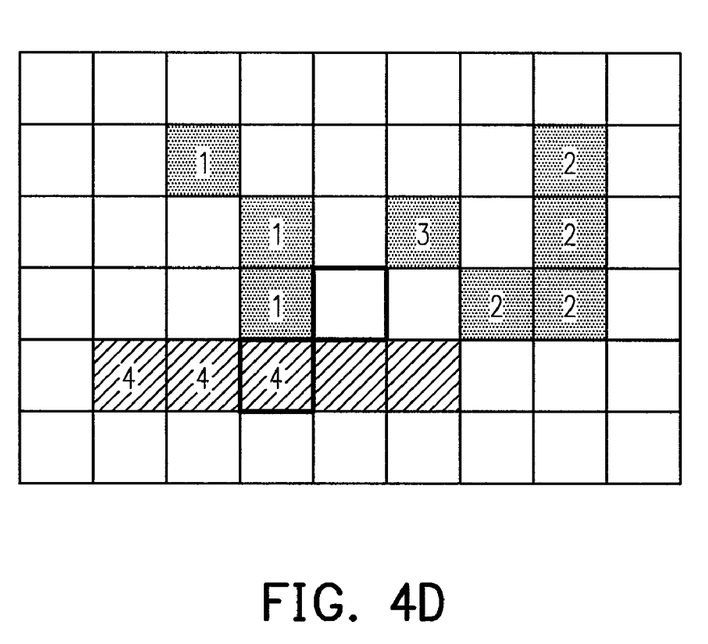
Figure 4E:
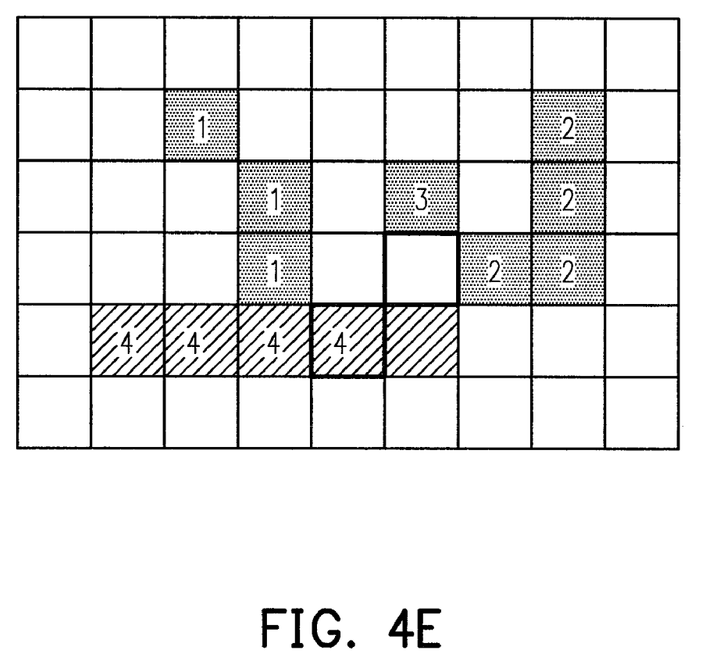

As shown in FIGS. 4D and 4E, since the upper right pixel of each of the third and the fourth object pixels in the object block 400 is a background pixel, the third and the fourth object pixels are each directly labeled as the temporary label "4" (that is, same as the temporary label of the left pixel), and the relationship between the temporary label and the representative label does not need to be updated.

Figure 4F:
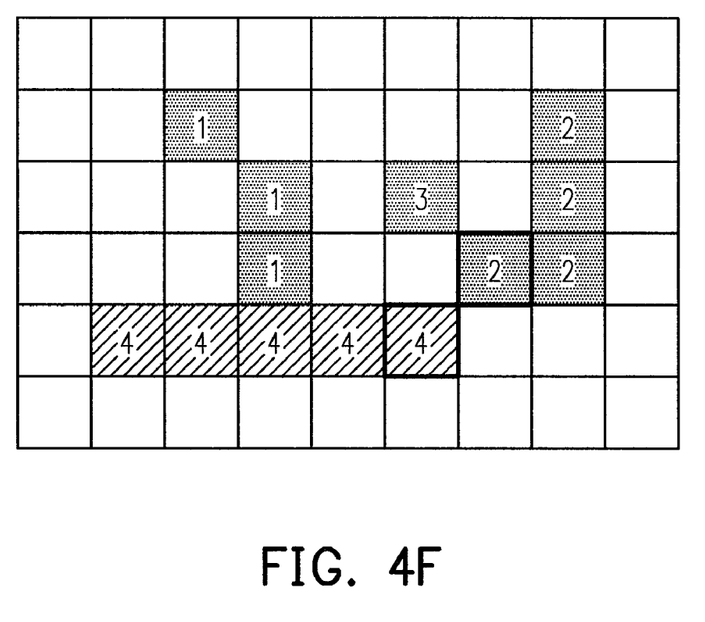

Finally, as shown in FIG. 4F, since an upper right pixel of a fifth object pixel in the object block 400 is not a background pixel, other than replacing a temporary label of the fifth object pixel with a temporary label of a left pixel thereof, a second label equivalence operation has to be performed. Referring to Table 3, since a representative label "1" corresponding to a temporary label "4" of the left pixel is smaller than a representative label "2" corresponding to a temporary label "2" of the upper right pixel in the fifth object pixel, the representative label "2" is replaced by the representative label "1"

according to a relationship between the temporary label and the representative label. That is, the temporary label "2" and the temporary label "3" originally corresponded to the representative label "2" are now corresponding to the representative label "1." A relationship between the temporary label and the representative label is illustrated in Table 4:

TABLE 4

| Temporary label | 1 | 2 | 3 | 4 |
|---|---|---|---|---|
| Representative label | 1 | 1 | 1 | 1 |

Through the above steps, each object pixel in the image is labeled with a temporary label, and a relationship between the temporary label and the representative label used is established. Therefore, the temporary label of each object pixel can be replaced with the corresponding representative label when the image is re-scanned by referring to the final relationship table (that is, Table 4). Consequently, the labeling of the connected components is completed.

Figure 5A:
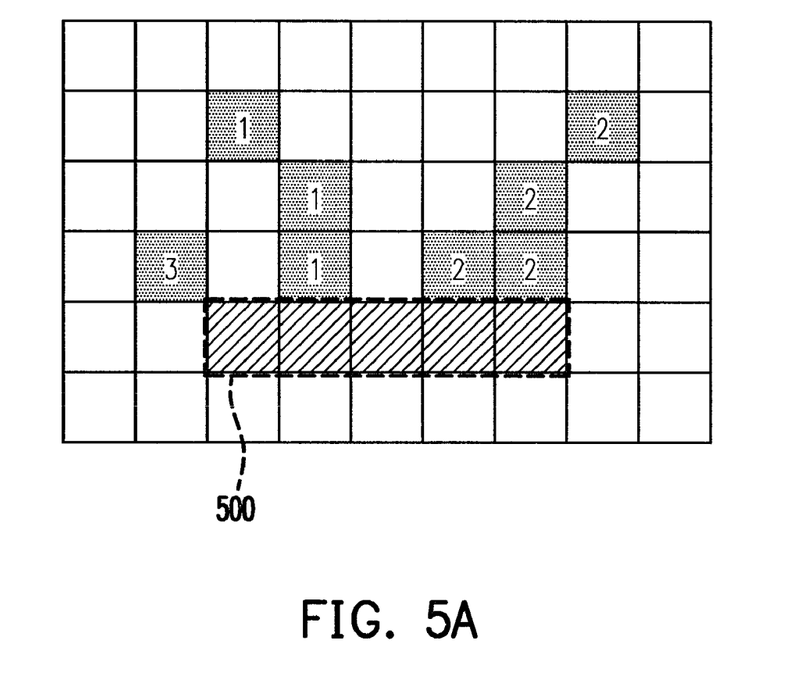
FIGS. 5A through 5F are schematic diagrams illustrating a labeling process according to another embodiment of the invention.

In the image shown in FIG. 5A, a blank block represents a background pixel, and a dotted block represents an object pixel labeled with a temporary label. In addition, the number in the block is the value of the corresponding temporary label of each object pixel. Here, three object pixels are each labeled with a temporary label "1," four object pixels are each labeled with a temporary label "2," and one object pixel is labeled with a temporary label "3." Table 5 illustrates a relationship between the current temporary label and the representative label corresponding thereto:

TABLE 5

| Temporary label | 1 | 2 | 3 |
|---|---|---|---|
| Representative label | 1 | 2 | 3 |

Figure 5B:
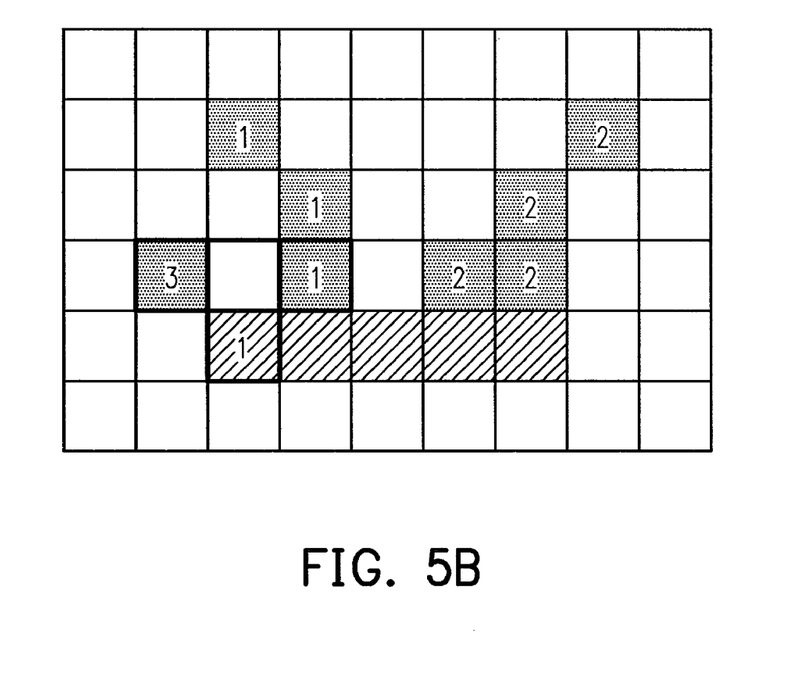

As shown in FIG. 5B, after the image has been scanned to obtain an object block 500, a first phase labeling process is first performed according to a first object pixel and an upper left pixel, an upper pixel, and an upper right pixel thereof. Here, the first object pixel is a leftmost pixel in the object block 500. Since the upper left pixel, the upper pixel, and the upper right pixel are not all background pixels, and representative labels corresponding to temporary labels of these pixels are not the same, a first label equivalence operation has to be performed. In the present embodiment, a representative label "1" corresponding to a temporary label "1" of the upper right pixel is smaller than a representative label "3" corresponding to a temporary label "3" of the upper left pixel. Therefore, the temporary label of the first object pixel has to equal the temporary label of the upper right pixel, and further, the representative label "3" is replaced by the representative label "1" in a relationship between the temporary label and the representative label. In other words, all of the temporary labels "3" originally corresponded to the representative label "3" are now corresponding to the representative label "1." The label updated relationship is shown in Table 6:

TABLE 6

| Temporary label | 1 | 2 | 3 |
|---|---|---|---|
| Representative label | 1 | 2 | 1 |

Figure 5C:
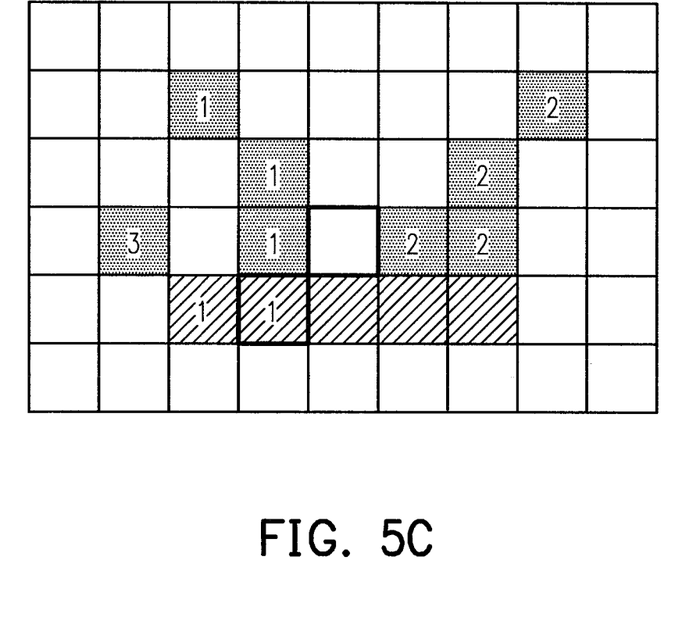

As shown in FIG. 5C, since an upper right pixel of a second object pixel is a background pixel, a temporary label of a left pixel of the second object pixel is directly used as the temporary label of the second object pixel. At this time, the relationship between the temporary label and the representative label does not need to be updated.

Figure 5D:
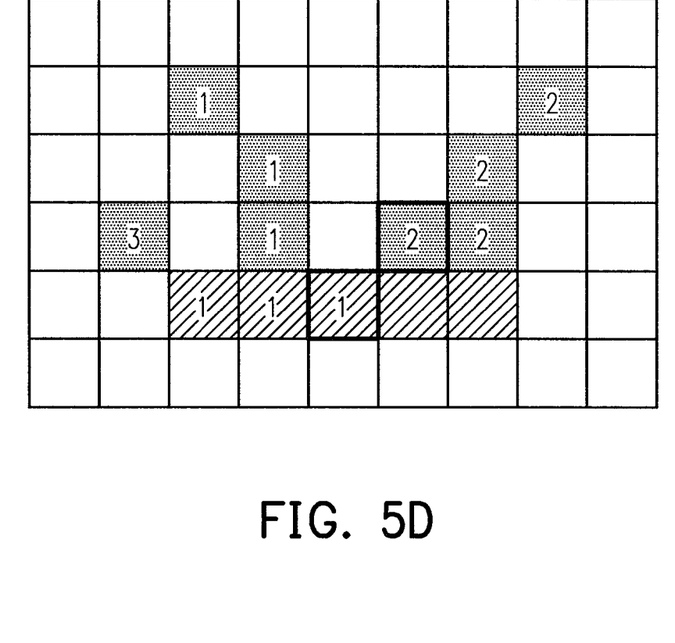

As depicted in FIG. 5D, since an upper right pixel of a third object pixel is an object pixel, a temporary label of the third object pixel has to equal a temporary label of a left pixel thereof, and whether representative labels respectively corresponding to the upper right pixel and the left pixel are the same is determined. As shown in Table 6, as the temporary label "1" and the temporary label "2" respectively correspond to different representative labels, a second label equivalence operation has to be performed. Firstly, values of the representative labels respectively corresponding to the upper right pixel and the left pixel are compared with each other. In the present embodiment, since the representative label "2" corresponding to the temporary label "2" of the upper right pixel is larger than the representative label "1" corresponding to the temporary label "1" of the left pixel, the representative label "2" has to be replaced by the representative label "1" according to the relationship. The label updated relationship is shown in Table 7:

TABLE 7

| Temporary label | 1 | 2 | 3 |
|---|---|---|---|
| Representative label | 1 | 1 | 1 |

Figure 5E:
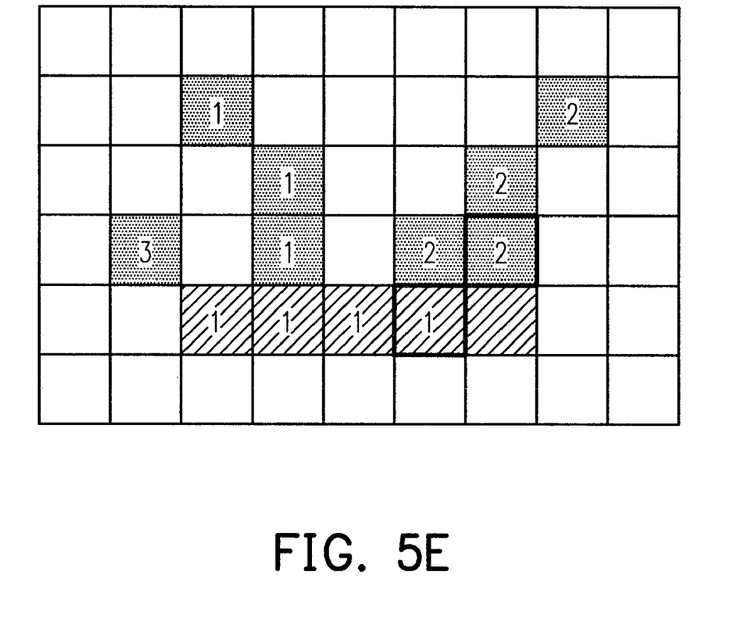
Figure 5F:
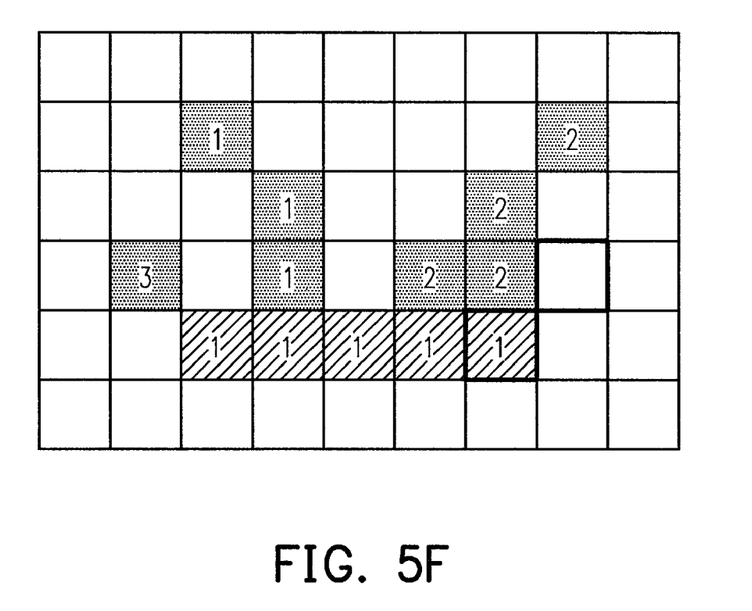

As graphically shown in FIG. 5E, since an upper right pixel of a fourth object pixel is an object pixel, a temporary label of the fourth object pixel has to equal a temporary label of a left pixel thereof, and whether representative labels respectively corresponding to the upper right pixel and the left pixel are the same is determined. As shown in Table 7, since a temporary label "2" of the upper right pixel and a temporary label "1" of the left pixel both correspond to the same representative label "1," a second label equivalence operation does not need to be performed. Finally, in FIG. 5F, since an upper right pixel of a fifth object pixel is a background pixel, only a temporary label of a fourth object pixel is used as a temporary label of a fifth object pixel. Therefore, the temporary label of each object pixel can be replaced with the corresponding representative label when the image is re-scanned by referring to the final relationship table (that is, Table 7) of the temporary label and the representative label. Consequently, the labeling of the connected components is completed.

In the aforementioned embodiments, the relationship between the temporary label and the representative label is recorded by two one-dimensional arrays. For example, the two one-dimensional arrays are represented by PLtable[ ] and NTtable[ ], respectively. In the labeling process, when a temporary label "m" is determined to be corresponding to a representative label "p," PLtable[m]=p is adopted to complete the above arrangement. In other words, a representative label corresponding to a temporary label "u" is a value recorded by PLtable[u].

For the convenience of illustration, all of the temporary labels corresponding to the same representative label are of the same set. The one-dimensional array NTtable[ ] is adopted to record the next label in the same set or the last label in the set. Moreover, the value of NTtable[ ] varies with PLtable[ ]. Assuming NTtable[i]=j and PLtable[i]=i, then "j" is the last label in the set. However, if PLtable[i]≠i, then "j" is the next label in the set. If "$t_1$" represents the last label in the set, then the value recorded in the NTtable[$t_1$] in the present embodiment is the second label in the set.

In the following, $S(l_1)$ and $S(l_2)$ represent the two label sets, and "$l_1$" represents the corresponding representative labels of all of the temporary labels in the set $S(l_1)$ while "$l_2$" represents the corresponding representative labels of all of the temporary labels in the set $S(l_2)$. If the two label sets need to be merged into one set during the first label equivalence operation or the second label equivalence operation, when "$l_1$" is smaller than "$l_2$," all of the temporary labels of $S(l_2)$ in PLtable[ ] should be updated to be corresponding to the representative label "$l_1$" by setting PLtable[$S(l_2)$]=$l_1$. On the contrary, when "$l_1$" is smaller than "$l_1$," the updating of the relationship can be completed by setting PLtable[$S(l_1)$]=$l_2$. For any temporary label "p," a first label "h" in the same set of the temporary label "p" can be obtained by acquiring the value recorded in the PLtable[p], and a last label "t" in the same set can be obtained according to the value recorded in the NTtable[h].

The conventional methods of labeling connected components usually adopt a double link list to record the labels. Thus, each label has to record the label value and the locations of the neighboring labels. However, in the present embodiment, two one-dimensional arrays are used to record the relationship between the temporary label and the representative label. Therefore, the present embodiment is easily implemented, saves more space, and is capable of completing the label equivalence operation rapidly. However, the implementation method mentioned above is merely one exemplary embodiment of the invention, and the scope of the invention is not limited thereto.

In summary, with the method of labeling connected components and the computer system using the method of the invention, after the image has been scanned for the first time, each object pixel is labeled with a temporary label, and a relationship between each object pixel and each representative label is established. Thereafter, the temporary label of each object pixel is replaced with a corresponding representative label when the image is scanned for the second time, such that the labeling of the connected components is completed during the two-time scanning of the image. Accordingly, the invention not only greatly reduces the time complexity to increase the labeling speed, but can also be adopted in various applications that require real-time visual identification results to satisfy the demands for identification efficiency.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A method of labeling connected components for an image having a plurality of pixels, wherein each of the plurality of pixels is an object pixel or a background pixel, and the method comprises:
   scanning the image in row-major order to acquire an object block located on the same row of the image, wherein the object block comprises i object pixels connected to one another, and i is a positive integer;
   performing a first phase labeling process according to an upper left pixel, an upper pixel, and an upper right pixel of a first object pixel in the object block to set a temporary label of the first object pixel and determine a representative label corresponding to the temporary label;
   when i is larger than 1, performing a second phase labeling process sequentially for i−1 times according to the upper right pixel of each of a second object pixel to an $i^{th}$ object pixel in the object block to set the temporary label of each of the second object pixel to the $i^{th}$ object pixel and determine the representative label corresponding to the temporary label;
   repeating the above steps until the image has been scanned completely; and
   replacing the temporary label of each object pixel in the image with the corresponding representative label according to a relationship between each temporary label and each representative label.

2. The method of labeling connected components as claimed in claim 1, wherein the step of performing the first phase labeling process comprises:
   determining whether the upper left pixel, the upper pixel, and the upper right pixel are all background pixels;
   when the upper left pixel, the upper pixel, and the upper right pixel are all determined to be background pixels, acquiring a new label value as the temporary label of the first object pixel and the representative label corresponding to the temporary label; and
   when the upper left pixel, the upper pixel, and the upper right pixel are not all determined to be background pixels, using the temporary label of the upper right pixel as the temporary label of the first object pixel, and determining whether the representative labels respectively corresponding to the temporary labels of the upper left pixel, the upper pixel, and the upper right pixel are the same.

3. The method of labeling connected components as claimed in claim 2, wherein after the step of determining whether the representative labels respectively corresponding to the temporary labels of the upper left pixel, the upper pixel, and the upper right pixel are the same, further comprises:
   when the representative labels respectively corresponding to the temporary labels of the upper left pixel, the upper pixel, and the upper right pixel are not the same, performing a first label equivalence operation according to the temporary labels of the upper left pixel and the upper right pixel.

4. The method of labeling connected components as claimed in claim 3, wherein the step of performing the first label equivalence operation comprises:
   designating the representative label corresponding to the temporary label of the upper left pixel as a first value;
   designating the representative label corresponding to the temporary label of the upper right pixel as a second value;
   when the first value is smaller than the second value, acquiring at least one to-be-updated temporary label from all of the temporary labels in which the representative label of each of the at least one to-be-updated temporary label is equal to the second value, and adopting the first value as the representative label corresponding to the at least one to-be-updated temporary label; and
   when the second value is smaller than the first value, acquiring at least one to-be-updated temporary label from all of the temporary labels in which the representative label of each of the at least one to-be-updated temporary label is equal to the first value, and adopting the second value as the representative label corresponding to the at least one to-be-updated temporary label.

5. The method of labeling connected components as claimed in claim 1, wherein the step of performing the second phase labeling process sequentially for i−1 times comprises:
   according to a sequence order of the second object pixel to the $i^{th}$ object pixel in the object block, acquiring one of the second object pixel to the $i^{th}$ object pixel as a currently-processed pixel;

adopting the temporary label of a left pixel of the currently-processed pixel as the temporary label of the currently-processed pixel;

when the upper right pixel of the currently-processed pixel is not the background pixel, determining whether the representative labels respectively corresponding to the temporary labels of the upper right pixel and the left pixel are the same;

when the representative labels respectively corresponding to the temporary labels of the upper right pixel and the left pixel are not the same, performing a second label equivalence operation according to the temporary labels of the upper right pixel and the left pixel; and repeating the above steps until the second object pixel to the $i^{th}$ object pixel have all been processed.

6. The method of labeling connected components as claimed in claim 5, wherein the step of performing the second label equivalence operation comprises:

designating the representative label corresponding to the temporary label of the left pixel as a first value;

designating the representative label corresponding to the temporary label of the upper right pixel as a second value;

when the first value is smaller than the second value, acquiring at least one to-be-updated temporary label from all of the temporary labels in which the representative label of each of the at least one to-be-updated temporary label is equal to the second value, and adopting the first value as the representative label corresponding to the at least one to-be-updated temporary label; and when the second value is smaller than the first value, acquiring at least one to-be-updated temporary label from all of the temporary labels in which the representative label of each of the at least one to-be-updated temporary label is equal to the first value, and adopting the second value as the representative label corresponding to the at least one to-be-updated temporary label.

7. The method of labeling connected components as claimed in claim 1, wherein the step of replacing the temporary label of each object pixel in the image with the corresponding representative label according to the relationship between each temporary label and each representative label comprises:

re-scanning the image, and when a processing pixel being scanned is the object pixel, replacing the temporary label of the processing pixel with the corresponding representative label according to the relationship between each temporary label and each representative label.

8. The method of labeling connected components as claimed in claim 1, wherein before the step of scanning the image in row-major order, further comprises:

performing a pixel classification process on the image for distinguishing each of the pixels to be the object pixel or the background pixel.

9. The method of labeling connected components as claimed in claim 1, wherein the row-major order is from the upper leftmost corner to the bottom rightmost corner, and the first object pixel is a leftmost pixel in the object block.

10. A computer system, comprising:

a processor; and a memory, storing program codes, and the processor performs the program codes to:

capture an image having a plurality of pixels, wherein each of the pixels is an object pixel or a background pixel;

scan the image in row-major order to acquire an object block located on the same row of the image, wherein the object block comprises i object pixels connected to one another, i is a positive integer;

perform a first phase labeling process according to an upper left pixel, an upper pixel, and an upper right pixel of a first object pixel in the object block to set a temporary label of the first object pixel and determine a representative label corresponding to the temporary label;

perform a second phase labeling process sequentially for i−1 times according to the upper right pixel of each of a second object pixel to an $i^{th}$ object pixel in the object block if i is larger than 1, so as to set the temporary label of each of the second object pixel to the $i^{th}$ object pixel and determine the representative label corresponding to the temporary label;

repeat the above operations until the image has been scanned completely; and replace the temporary label of each object pixel in the image with the corresponding representative label according to a relationship between each temporary label and each representative label.

11. The computer system as claimed in claim 10, wherein the step of performing the first phase labeling process comprises:

determining whether the upper left pixel, the upper pixel, and the upper right pixel are all background pixels;

when the upper left pixel, the upper pixel, and the upper right pixel are all determined to be background pixels, acquiring a new label value as the temporary label of the first object pixel and the representative label corresponding to the temporary label; and when the upper left pixel, the upper pixel, and the upper right pixel are not all determined to be background pixels, using the temporary label of the upper right pixel as the temporary label of the first object pixel, and determining whether the representative labels respectively corresponding to the temporary labels of the upper left pixel, the upper pixel, and the upper right pixel are the same.

12. The computer system as claimed in claim 11, wherein after the step of determining whether the representative labels respectively corresponding to the temporary labels of the upper left pixel, the upper pixel, and the upper right pixel are the same, further comprises:

when the representative labels respectively corresponding to the temporary labels of the upper left pixel, the upper pixel, and the upper right pixel are not the same, performing a first label equivalence operation according to the temporary labels of the upper left pixel and the upper right pixel.

13. The computer system as claimed in claim 12, wherein the step of performing the first label equivalence operation comprises:

designating the representative label corresponding to the temporary label of the upper left pixel as a first value;

designating the representative label corresponding to the temporary label of the upper right pixel as a second value;

when the first value is smaller than the second value, acquiring at least one to-be-updated temporary label from all of the temporary labels in which the representative label of each of the at least one to-be-updated temporary label is equal to the second value, and adopting the first value as the representative label corresponding to the at least one to-be-updated temporary label; and when the second value is smaller than the first value, acquiring at least one to-be-updated temporary label from all of the temporary labels in which the representative label of each of the at least one to-be-updated temporary label is equal to the first value, and adopting the second value as the representative label corresponding to the at least one to-be-updated temporary label.

14. The computer system as claimed in claim 10, wherein the step of performing the second phase labeling process sequentially for i−1 times comprises:
according to a sequence order of the second object pixel to the $i^{th}$ object pixel in the object block, acquiring one of the second object pixel to the $i^{th}$ object pixel as a currently-processed pixel;
adopting the temporary label of a left pixel of the currently-processed pixel as the temporary label of the currently-processed pixel;
when the upper right pixel of the currently-processed pixel is not the background pixel, determining whether the representative labels respectively corresponding to the temporary labels of the upper right pixel and the left pixel are the same;
when the representative labels respectively corresponding to the temporary labels of the upper right pixel and the left pixel are not the same, performing a second label equivalence operation according to the temporary labels of the upper right pixel and the left pixel; and
repeating the above steps until the second object pixel to the $i^{th}$ object pixel have all been processed.

15. The computer system as claimed in claim 14, wherein the step of performing the second label equivalence operation comprises:
designating the representative label corresponding to the temporary label of the left pixel as a first value;
designating the representative label corresponding to the temporary label of the upper right pixel as a second value;
when the first value is smaller than the second value, acquiring at least one to-be-updated temporary label from all of the temporary labels in which the representative label of each of the at least one to-be-updated temporary label is equal to the second value, and adopting the first value as the representative label corresponding to the at least one to-be-updated temporary label; and
when the second value is smaller than the first value, acquiring at least one to-be-updated temporary label from all of the temporary labels in which the representative label of each of the at least one to-be-updated temporary label is equal to the first value, and adopting the second value as the representative label corresponding to the at least one to-be-updated temporary label.

16. The computer system as claimed in claim 10, wherein the step of replacing the temporary label of each object pixel in the image with the corresponding representative label according to the relationship between each temporary label and each representative label comprises:
re-scanning the image, and when a processing pixel being scanned is the object pixel, replacing the temporary label of the processing pixel with the corresponding representative label according to the relationship between each temporary label and each representative label.

17. The computer system as claimed in claim 10, wherein before the step of scanning the image in row-major order, further comprises:
performing a pixel classification process on the image for distinguishing each of the pixels to be the object pixel or the background pixel.

18. The computer system as claimed in claim 10, wherein the row-major order is from the upper leftmost corner to the bottom rightmost corner, and the first object pixel is a leftmost pixel in the object block.

19. A computer system, comprising:
an image acquiring circuit, capturing an image having a plurality of pixels, wherein each of the pixels is an object pixel or a background pixel;
a first scanning circuit, coupled to the image acquiring circuit and used for scanning the image in row-major order to acquire an object block located on the same row of the image, wherein the object block comprises i object pixels connected to one another, i is a positive integer, and the first scanning circuit is used for performing a first phase labeling process according to an upper left pixel, an upper pixel, and an upper right pixel of a first object pixel in the object block to set a temporary label of the first object pixel and determine a representative label corresponding to the temporary label, and used for performing a second phase labeling process sequentially for i−1 times according to the upper right pixel of each of a second object pixel to an $i^{th}$ object pixel in the object block if i is larger than 1, so as to set the temporary label of each of the second object pixel to the $i_{th}$ object pixel and determine the representative label corresponding to the temporary label, and the first scanning circuit being used for repeating the above operations until the image has been scanned completely; and
a second scanning circuit, coupled to the first scanning circuit, used for replacing the temporary label of each object pixel in the image with the corresponding representative label according to a relationship between each temporary label and each representative label.

20. The computer system as claimed in claim 19, wherein when performing the first phase labeling process, the first scanning circuit determines whether the upper left pixel, the upper pixel, and the upper right pixel are all background pixels; when the upper left pixel, the upper pixel, and the upper right pixel are all determined to be background pixels, the first scanning circuit acquires a new label value as the temporary label of the first object pixel and the representative label corresponding to the temporary label; and when the upper left pixel, the upper pixel, and the upper right pixel are not all determined to be background pixels, the first scanning circuit uses the temporary label of the upper right pixel as the temporary label of the first object pixel, and determines whether the representative labels respectively corresponding to the temporary labels of the upper left pixel, the upper pixel, and the upper right pixel are the same.

21. The computer system as claimed in claim 20, wherein when the representative labels respectively corresponding to the temporary labels of the upper left pixel, the upper pixel, and the upper right pixel are not the same, the first scanning circuit performs a first label equivalence operation according to the temporary labels of the upper left pixel and the upper right pixel.

22. The computer system as claimed in claim 21, wherein when performing the first label equivalence operation, the first scanning circuit designates the representative label corresponding to the temporary label of the upper left pixel as a first value and designates the representative label corresponding to the temporary label of the upper right pixel as a second value; when the first value is smaller than the second value, the first scanning circuit acquires at least one to-be-updated temporary label from all of the temporary labels in which the representative label of each of the at least one to-be-updated temporary label is equal to the second value, and adopts the first value as the representative label corresponding to the at least one to-be-updated temporary label;

and when the second value is smaller than the first value, the first scanning circuit acquires at least one to-be-updated temporary label from all of the temporary labels in which the representative label of each of the at least one to-be-updated temporary label is equal to the first value, and adopts the second value as the representative label corresponding to the at least one to-be-updated temporary label.

23. The computer system as claimed in claim 19, wherein when performing the second phase labeling process sequentially for i−1 times, the first scanning circuit acquires one of the second object pixel to the $i^{th}$ object pixel as a currently-processed pixel according to a sequence order of the second object pixel to the $i^{th}$ object pixel in the object block; adopts the temporary label of a left pixel of the currently-processed pixel as the temporary label of the currently-processed pixel; when the upper right pixel of the currently-processed pixel is not the background pixel, the first scanning circuit determines whether the representative labels respectively corresponding to the temporary labels of the upper right pixel and the left pixel are the same; when the representative labels respectively corresponding to the temporary labels of the upper right pixel and the left pixel are not the same, the first scanning circuit performs a second label equivalence operation according to the temporary labels of the upper right pixel and the left pixel; and the first scanning circuit repeats the above operations until the second object pixel to the $i^{th}$ object pixel have all been processed.

24. The computer system as claimed in claim 23, wherein when performing the second label equivalence operation, the first scanning circuit designates the representative label corresponding to the temporary label of the left pixel as a first value and designates the representative label corresponding to the temporary label of the upper right pixel as a second value; when the first value is smaller than the second value, the first scanning circuit acquires at least one to-be-updated temporary label from all of the temporary labels in which the representative label of each of the at least one to-be-updated temporary label is equal to the second value, and adopts the first value as the representative label corresponding to the at least one to-be-updated temporary label; and when the second value is smaller than the first value, the first scanning circuit acquires at least one to-be-updated temporary label from all of the temporary labels in which the representative label of each of the at least one to-be-updated temporary label is equal to the first value, and adopts the second value as the representative label corresponding to the at least one to-be-updated temporary label.

25. The computer system as claimed in claim 19, wherein the second scanning circuit re-scans the image, and when a processing pixel being scanned is the object pixel, the second scanning circuit replaces the temporary label of the processing pixel with the corresponding representative label according to the relationship between each temporary label and each representative label.

26. The computer system as claimed in claim 19, wherein the image acquiring circuit performs a pixel classification process on the image for distinguishing each of the pixels to be the object pixel or the background pixel.

27. The computer system as claimed in claim 19, wherein the row-major order is from the upper leftmost corner to the bottom rightmost corner, and the first object pixel is a leftmost pixel in the object block.

* * * * *